Dec. 11, 1956 A. ARBORGH 2,773,558
SEPARATOR FOR LIQUID DROPS OR FOAM
Filed June 22, 1954
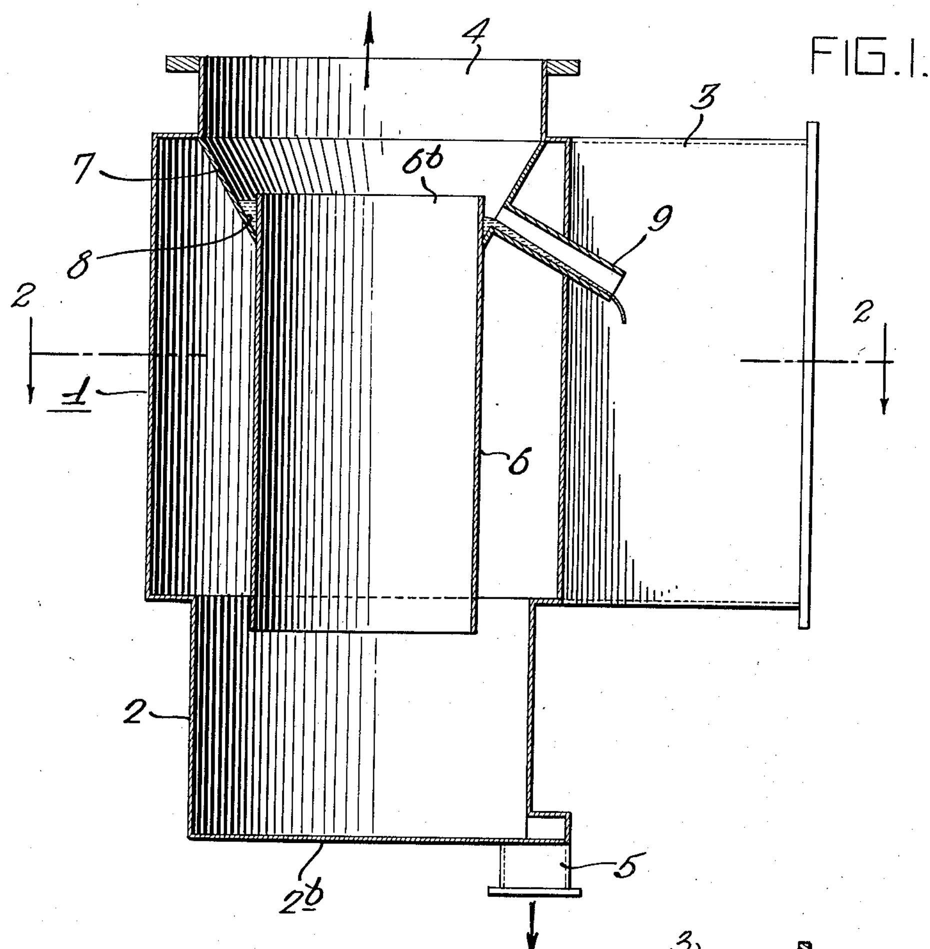
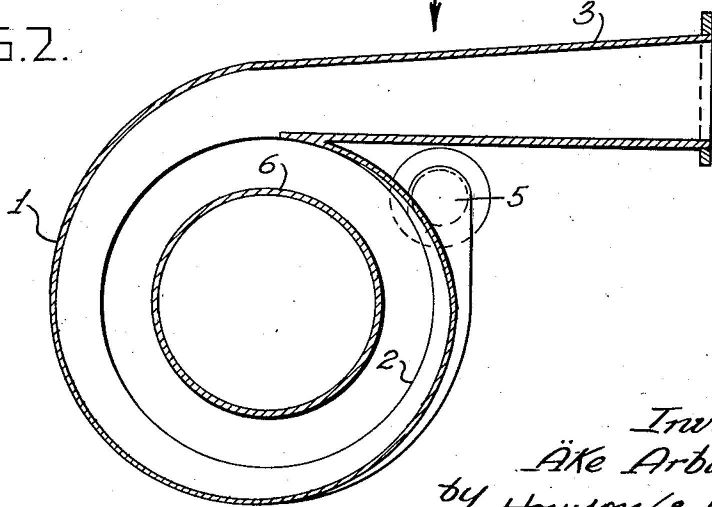
Inventor:
Åke Arborgh
by Howson & Howson
Attys.

United States Patent Office 2,773,558 Patented Dec. 11, 1956

2,773,558

SEPARATOR FOR LIQUID DROPS OR FOAM

Ake Arborgh, Jonkoping, Sweden, assignor to Aktiebolaget Svenska Flaktfabriken, Stockholm, Sweden Application June 22, 1954, Serial No. 438,552

Claims priority, application Sweden June 30, 1953

1 Claim. (Cl. 183—83)

In the technical field there is a need for separating drops of water or particles of liquid from a flowing gaseous medium. For this purpose dehydrating devices of different kind, filters and devices based upon the use of centrifugal force have been used. The last mentioned devices include drop separators of cyclonic type giving a relatively good separating effect. In certain plants even the existence of a small quantity of very small liquid particles involves a great disadvantage as for instance in compressed air plants equipped with pistons, where oil particles carried by the gaseous medium will cause damage and furthermore will adversely affect the health of persons occupying the workrooms. In the same manner liquid particles can damage the compressors in drying plants having closed circulation and equipped with turbo compressors.

The present invention relates to separators of cyclonic type especially designed to make it possible to separate even very small liquid particles. It has been proved that in conventional cyclonic separators these small liquid particles are carried with the air current and are thrown towards the walls of the central tube and "walk" towards the outlet of the tube owing to the direction of the air. At the outlet these liquid particles in the form of drops are again picked up by the air current.

The invention thus relates to a device for separating liquid drops or foam from a gaseous medium which device consists of a cyclonic separator having a tangential inlet and a concentrically arranged outlet and a helical upper casing and a cylindrical extension fastened to this casing, and at its lowest part being provided with a bottom and an outlet for liquid. The device furthermore is provided with a truncated cone connection between the cylindrical central tube and the outlet. The device according to the invention is also characterized by an extension of the cylindrical central tube projecting upwards and forming an annular groove between said extension and the truncated cone for receiving liquid drops and foam and provided with a pipe passing through the casing of the device for discharging said liquid.

The invention is based upon the fact that when an air current passes the outlet end of a tube a partial subpressure occurs at the outlet of the pipe. In this way eddies of air will occur carrying liquid particles towards the conical part where the particles will be precipitated and collected in the groove.

The invention will now be more clearly described in connection with the accompanying drawing, Fig. 1 is a vertical sectional view through a separator made according to the present invention; and Fig. 2 is a sectional view on line 2—2, Fig. 1.

In the drawing, reference numeral 1 illustrates the upper part of the separator designed as a spiral casing and 2 illustrates the lower cylindrical part of same. An inlet 3 for the liquid-commingled air is connected to the upper part of the separator. Numeral 4 indicates an outlet for the departing cleaned air. An outlet 5 for separated liquid is arranged in the plane bottom **2*b* of the cylindrical part of the separator. In the upper part of the separator there is a cylindrical central tube 6, the outlet end 6*b* of which projects somewhat into the conical connection 7 of the outlet. The groove 8 formed in the angle between the central tube and the conical part is provided with an outlet 9** for liquid separated in this space.

What I claim is:

A device for separating liquid drops and foam from a gaseous medium comprising a cyclonic separator including a spiral casing having a tangential inlet thereto, a cylindrical bottom casing underlying the spiral casing coaxially thereof and having an outlet for separated liquid drops and foam, means defining an outlet for the gaseous medium at the top of the spiral casing disposed coaxially of said spiral casing and the bottom casing, a central tube disposed interiorly of the separator and extending coaxially therein from the upper portion of the bottom casing through the spiral casing and terminating in spaced relation below the outlet at the top of the latter, an upwardly divergent wall circumscribing the upper portion of the central tube and extending from the latter to said outlet at the top of the spiral casing with the upper end of said central tube projecting within the divergent wall and forming therewith an annular groove for receiving liquid drops and foam separated from the gaseous medium, and an outlet pipe connected to the groove for discharging the liquid drops and foam collected in said groove.

References Cited in the file of this patent

UNITED STATES PATENTS

| | | |
|---|---|---|
| 394,240 | Allington et al. | Dec. 11, 1888 |
| 841,393 | Harris | Jan. 15, 1907 |
| 1,231,371 | Jones | June 26, 1917 |
| 1,245,540 | Wegner | Nov. 6, 1917 |